United States Patent
Ayres et al.

(10) Patent No.: US 7,382,176 B2
(45) Date of Patent: Jun. 3, 2008

(54) CHARGE PUMP CIRCUIT

(75) Inventors: John R. A. Ayres, Reigate (GB); Keitaro Yamashita, Ashiya (JP)

(73) Assignee: TPO Hong Kong Holding Limited, Shatin, Hong Kong SAR (CN)

( * ) Notice: Subject to any disclaimer, the term of this patent is extended or adjusted under 35 U.S.C. 154(b) by 0 days.

(21) Appl. No.: 10/542,674

(22) PCT Filed: Dec. 24, 2003

(86) PCT No.: PCT/IB03/06352

§ 371 (c)(1), (2), (4) Date: Jan. 20, 2006

(87) PCT Pub. No.: WO2004/066478

PCT Pub. Date: Aug. 5, 2004

(65) Prior Publication Data
US 2006/0176102 A1 Aug. 10, 2006

(30) Foreign Application Priority Data
Jan. 17, 2003 (GB) ................. 0301077.4
Jun. 24, 2003 (GB) ................. 0314644.6

(51) Int. Cl.
*H02M 3/18* (2006.01)
*G05F 3/16* (2006.01)

(52) U.S. Cl. ........................................ 327/536; 363/60
(58) Field of Classification Search ................ None
See application file for complete search history.

(56) References Cited

U.S. PATENT DOCUMENTS

| | | | |
|---|---|---|---|
| 5,572,414 A * | 11/1996 | Komori | 363/60 |
| 5,815,446 A * | 9/1998 | Tobita | 365/189.09 |
| 5,831,844 A | 11/1998 | Sudo | |
| 6,107,864 A | 8/2000 | Fukushima et al. | |
| 6,400,210 B2 * | 6/2002 | Myono | 327/536 |
| 6,519,191 B1 * | 2/2003 | Morishita | 365/189.09 |
| 6,693,483 B2 * | 2/2004 | Deml et al. | 327/536 |
| 7,005,912 B2 * | 2/2006 | Nonaka | 327/536 |

* cited by examiner

*Primary Examiner*—N. Drew Richards
*Assistant Examiner*—Terry L. Englund
(74) *Attorney, Agent, or Firm*—Liu & Liu

(57) ABSTRACT

A charge pump circuit has a voltage increasing stage and a voltage decreasing stage in parallel, and sharing a common input. This shows charge to flow between the stages, so that charge used in the pumping of one stage is recycled to the other stage.

19 Claims, 6 Drawing Sheets

CHARGE PUMP CIRCUIT

This invention relates to a charge pump circuit. In particular, it relates to a charge pump circuit which is capable of providing voltage outputs which are not integer multiples of the supply voltages. The invention also relates to electronic devices including such a circuit, particularly but not exclusively, large-area electronic (LAE) devices such as an active matrix liquid crystal display (AMLCD) or another type of active matrix display. A semiconductor device or semiconductor integrated circuit is another device form, in which the charge pump circuit may, for example, be integrated.

Charge pump circuits are known for providing a boosted DC voltage from a lower DC voltage supply. The boosted voltage may be more positive than the high level of the input supply voltage or, alternatively, more negative than the low level of the input supply voltage. Such circuits may comprise a series of voltage boosting stages which each include a switch connected to a capacitor, the switch controlling the flow of charge onto the capacitor. Such a circuit is disclosed for example in WO 02/061930. The switch of each stage is provided at the input of the stage, and the output of each stage is the junction between the switch and capacitor. The input to the circuit is a DC current supply at the lower voltage magnitude. The capacitors are connected alternately to one of two complementary clocked control lines which control the switching operation, which in turn controls the so-called pumping of charge along the series of stages.

During operation of the circuit, one clock cycle causes a charge stored on the capacitors connected to one of the control lines to be passed to the capacitors of the respective next stage. The voltage across the capacitors increases progressively along the series of voltage boosting stages. A larger number of stages leads to a larger output voltage for the circuit.

For a given power supply with a low voltage level of $V_{SS}=0V$ (for the sake of explanation only) and a high voltage level of $V_{DD}$, charge pump circuits of the type disclosed in WO 02/061930 are used to generate a voltage of $(n+1)V_{DD}$ in the case of a positive charge pump and $-nV_{DD}$ in the case of a negative charge pump, where n is an integer equal to the number of stages in the charge pump. However, it is often the case that the output voltage required is not equal to an integer multiple of the power supply voltage $V_{DD}$. In this case, it is known to use additional circuitry to regulate the output voltage to the required value, which provides a fundamental limit to the theoretical efficiency that can be achieved.

For example, a single stage positive charge pump with a 5V input voltage would normally generate an output voltage of 10V. If this is regulated down to a required output voltage of 7.5V, the maximum theoretical efficiency of the charge pump is reduced to 75%.

U.S. Pat. No. 5,790,393 discloses a charge pump circuit for generating a fractional multiple of the supply voltage. The capacitor storing the pumped charge is connected in parallel with an additional capacitor at the output of the circuit in order to reduce the output voltage to a level which is the required fractional multiple. Although this circuit does not use a voltage regulator, it also has the disadvantage of a limited maximum theoretical efficiency.

In addition to providing fractional multiples of the voltage supply lines, there is often a need both for a voltage above that of the high voltage supply line and a voltage below that of the low voltage supply line.

One example of an application of charge pump circuits is in portable electronic devices having display screens. A relatively high voltage is needed for the display, for example 15V, whereas the device is to be powered by a relatively low voltage supply, for example 3V. The use of a voltage boosting device such as a charge pump circuit is clearly appropriate.

According to the invention, there is provided a charge pump circuit comprising:

a voltage increasing stage;

a voltage decreasing stage in parallel with the voltage increasing stage; and a shared input to the voltage increasing and voltage decreasing stages.

The invention addresses the problem of generating two (or possibly more) boosted voltages, one of which is in the positive sense and one of which is in the negative sense relative to the power supply voltages. Furthermore, the circuit enables voltages to be generated which are not equal to an integer multiple of the power supply voltage. In particular, charge used in the pumping of one stage can be recycled to the other stage, as the voltage increasing stage and the voltage decreasing stage require charge pumping in opposite senses. Thus, an efficient means of generating the required voltages is provided.

The voltage increasing stage is preferably for increasing an input voltage by an integer multiple of the difference between a low supply line voltage and a high supply line voltage and the voltage decreasing stage is for decreasing an input voltage by an integer multiple of the difference between a low supply line voltage and a high supply line voltage. By selecting the input voltage at a value between the supply line voltages, the output voltages are non-integer multiples of the supply line voltages.

The voltage increasing stage may comprise one or more charge pump sections, each for increasing the input voltage by the difference between a low supply line voltage and a high supply line voltage. Similarly, the voltage decreasing stage may comprise one or more charge pump sections, each for decreasing the input voltage by the difference between a low supply line voltage and a high supply line voltage.

Each charge pump section preferably comprises an input switch and an output switch in series connected together at a junction node, and a charge pump capacitor connected between junction node and a control line.

Each charge pump section may comprise a first input switch and output switch in series connected together at a first junction node, a second input switch and output switch in series connected together at a second junction node, a first charge pump capacitor connected between the first junction node and a first control line and a second charge pump capacitor connected between the second junction node and a second control line. This provides two pump circuits in parallel, so that charge pumping can be performed during all clock cycles.

In another arrangement each charge pump section of the voltage increasing stage and of the voltage decreasing stage may comprise a first input switch and output switch in series connected together at a first junction node, and a second input switch connected between the input and a second junction node, a first charge pump capacitor connected between the first junction node and a first control line and a second capacitor connected between the second junction node and a second control line, wherein the second junction node provides the control signals for the first input and output switches.

In this arrangement, only one charge pump capacitor is provided in each charge pump circuit, and the other capacitor is for generating appropriate switch control signals. Complementary signals are again applied to the first and second control lines. However, in both arrangements, non-overlapping signals may be used instead.

The invention also provides an integrated circuit device or other electronic device which may be formed using, for example, low temperature poly-silicon processing and which includes a charge pump circuit of the invention. The device may comprise an active matrix liquid crystal display device, with the charge pump circuit and a TFT switching array for the display being provided on a common substrate.

Embodiments of the invention will now be described by way of example with reference to the accompanying drawings, in which.

The same reference numbers and symbols are used throughout the Figures to denote the same or similar features.

The invention provides a circuit capable of generating two (or possibly more) boosted voltages, one of which is in the positive sense and one of which is in the negative sense relative to the power supply voltages. Furthermore, the circuit enables these voltages to be equal to non-integer multiples of the power supply voltage. This provides an efficient way of generating voltages for example for an analogue switch, where it may be necessary to generate voltages above and below the power rails in order to ensure the switch can be properly turned on and off. This capability is required in a large number of analogue circuit applications.

Figure 1:
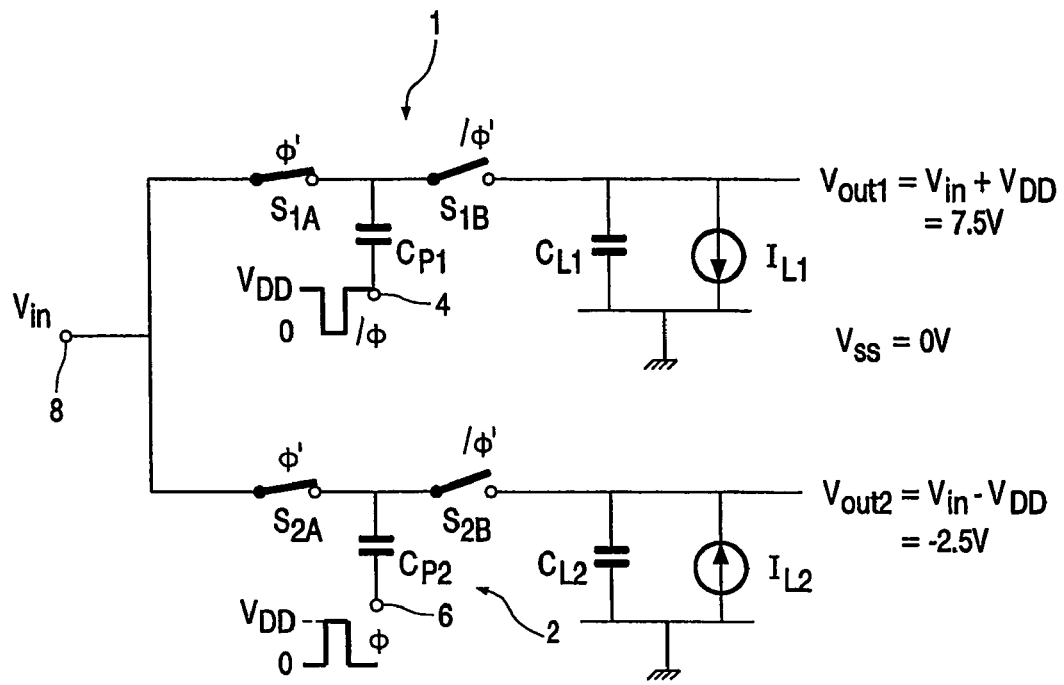
FIG. 1 is a schematic circuit diagram of a charge pump circuit in accordance with the invention.

FIG. 1 shows in schematic form a charge pump circuit in accordance with the invention, for illustrating the basic idea behind the invention.

The circuit includes a voltage boosting stage 1 and a voltage decreasing stage 2. Each stage has an input switching device $S_{1A}$, $S_{2A}$ (referred to generally as $S_{nA}$ in the following) and a charge pump capacitor $C_{P1}$, $C_{P2}$ (referred to generally as $C_{Pn}$ in the following) connected in series between the input to the stage and a respective voltage control terminal 4, 6. The output from each stage 1, 2 comprises the node between the switching device $S_{nA}$ and the capacitor $C_{Pn}$. This node is connected to the output of the stage through an output switch $S_{1B}$, $S_{2B}$ (referred to generally as $S_{nB}$ in the following).

The input and output switches $S_{nA}$, $S_{nB}$ are switched with complementary signals (φ' and /φ') so that the charge pump capacitor is alternately connected to the input 8 and to the output of the stage.

The voltages on the voltage control terminals 4, 6 are switchable between two levels. This is achieved by providing a square tooth waveform to the terminals 4,6. The voltages supplied to the control voltage terminals 4 and 6 alternate voltage levels corresponding to the voltages of a high voltage supply rail and a low voltage supply rail. For example, the low voltage supply rail may be a ground connection.

The voltage on one terminal 4 (/φ) is the complement of the voltage on the other 6 (φ), so that one signal has opposite polarity to the other, but is clocked at the same time.

The same control signal waveform timing may be used for the control of the input and output switches as for the control lines 4, 6. In other words φ can have the same transitions as φ'. Thus, when CP1 is connected to the low voltage and CP2 is connected to the high voltage, switches S1A and S2A are closed (low impedance) and S1B and S2B are open (i.e. high impedance). Similarly when CP1 is connected to the high voltage and CP2 is connected to the low voltage, switches S1A and S2A are open (high impedance) and S1B and S2B are closed (low impedance). The actual nature of the control signals φ' and /φ' depends upon the nature of the switches.

In operation of each stage, a DC input voltage Vin is applied to the input 8 of the charge pump circuit. This voltage source supplies a mean current that is approximately equal to the difference in the mean load currents drawn at the outputs, so $I(Vin)=I_{L1}-I_{L2}$. If $I_{L2}$ is greater than $I_{L1}$, the Vin will sink current, whereas if $I_{L1}$ is greater than $I_{L2}$ it will supply current.

Taking the voltage boosting stage 1 by way of example, when the input switch $S_{1A}$ is closed, charge flows to the capacitor $C_{P1}$, to charge it to the input voltage (less any voltage drop across the switch). This charge is provided to the capacitor when the control terminal 4 is connected to the low control voltage (e.g. 0V) and the input switch is closed. At the next clock cycle, and after the capacitor has charged, the switch $S_{1A}$ is opened, and the voltages on the control terminals are reversed. The voltage across the capacitor $C_{P1}$ will then add to the new higher voltage (e.g. 5V) on the control terminal 4, so that an increased voltage appears at the output of the stage.

This increased output voltage is provided to the output through the closed output switch $S_{1B}$.

The voltage decreasing stage 2 in FIG. 1 operates in similar manner, but provides a step decrease in the voltage corresponding to the magnitude of the voltage difference between the high and low power rails (shown as 0V and $V_{DD}$ in FIG. 1).

The operation of the circuit is achieved after an initial settling period which is required for the output voltages to reach their steady state levels. The output voltages rise and fall around this steady state level as charge is pumped along the circuit and current is supplied to the load. The magnitude of this ripple is reduced by increasing the size of the capacitors connected at the output of the charge pumps. The charge pumping operation is well known and will not be described in further detail.

In accordance with the invention, the voltage boosting and voltage decreasing stages 1, 2 share a common input Vin. The input voltage Vin lies between the power supply rail voltages. In conventional circuits, a negative charge pump would have its input connected to the low voltage supply rail and the positive charge pump would have its input connected to the high voltage supply rail $V_{DD}$. By connecting together the two inputs, the efficient generation of non-integer multiples of the power supply voltage is provided, because charge injected by the voltage decreasing charge pump can be recycled back into the voltage increasing charge pump. This minimises the current that must be supplied by the voltage source Vin.

Decoupling capacitors $C_{L1}$ and $C_{L2}$ are provided at the outputs, and connected to ground. These capacitors could in fact be connected to any low impedance constant voltage source. The decoupling capacitors are charged (i.e. pumped) to the output voltage during the start-up phase. They serve to minimise the ripple in output voltage during operation (the larger they are the lower the ripple). This is required because the charge on $C_{L1}$ and $C_{L2}$ is topped up once per clock cycle, but the load is likely to draw current continuously. The decoupling capacitors are likely to be off-glass external components.

The operation of the circuit will now described in further detail assuming the low power line voltage $V_{SS}$ to be 0V and the high power line voltage to be $V_{DD}$. The circuit in FIG. 1 generates a positive output voltage Vout1=Vin+$V_{DD}$ and a negative output voltage Vout2=Vin-$V_{DD}$, where Vin is a voltage between 0 and $V_{DD}$.

Although the difference between Vout1 and Vout2 is always equal to $2V_{DD}$, the absolute levels of Vout1 and Vout2 can be adjusted from between $2V_{DD}$ and 0V respectively at the upper end down to $V_{DD}$ and -$V_{DD}$ respectively at the lower end, depending on the value of Vin. This circuit offers advantages over conventional approaches when the required output voltages lie between these two limits. This is because the negative charge pump that generates Vout2 injects charge back towards the input voltage source Vin. However, at the same time the positive charge pump that generates Vout1 draws charge from the voltage source Vin. Consequently, the net effect is that charge from the negative charge pump can be recycled back into positive charge pump.

FIG. 1 also represents the load driven by the two generated voltages as a first current source $I_{L1}$ connected between the boosted voltage and the low power supply line voltage (ground in this example), and a second current source $I_{L2}$ connected between the reduced voltage and the low power supply line voltage. These load currents depend upon the load driven by the circuit.

If the load currents $I_{L1}$ and $I_{L2}$ are equal, there is no net current flow into or from the voltage source Vin, which means that the voltage source can be designed with a high resistance. In the case where Vin is a voltage source with 100% efficiency, the charge pump switches are ideal and the pump capacitors are infinite, the theoretical efficiency is equal to 100% provided that $I_{L1}$ is greater than or equal to $I_{L2}$. If $I_{L1}$ is less than $I_{L2}$ and charge injected into the voltage source Vin cannot be recycled, then the efficiency decreases accordingly.

The circuit in FIG. 1 shows charge pumps formed using switches, but diodes could instead be used. Also, the positive and negative charge pumps illustrated in FIG. 1 have only a single stage.

The principle can be easily extended to charge pumps with multiple stages, in which case the positive output voltage becomes Voutp=Vin+$nV_{DD}$ (where n is the number of stages in the positive charge pump) and the negative output voltage becomes Voutn=Vin-$mV_{DD}$ (where m is the number of stages in the negative charge pump).

In a multiple stage arrangement, charge flows (or is pumped) from the capacitor in one stage to the capacitor in the next. The capacitor in next stage has the opposite control voltage applied to it at this time, so that the capacitor of this next stage has a higher voltage across it than the voltage across the capacitor in the previous stage. The capacitor voltage thus increases along the series of stages.

The voltage across one capacitor will be greater than the voltage across the previous capacitor by the difference between the control voltages (ignoring the voltage drop across the switches). This is the so-called boost voltage.

In a chain of charge pumps, adjacent pumps are controlled by complementary control signals, so that there are two voltage control terminals each associated with a different set of voltage boosting stages.

There can also be a number of positive charge pumps (each with a number of stages) and a number of negative charge pumps (each with a number of stages) connected to the same input voltage source Vin. Again, the criteria for obtaining the optimum efficiency due to charge recycling is that the current injected by negative charge pumps back towards the input voltage source Vin should be less than or equal to the current drawn by the positive charge pumps from the source Vin.

In order to ensure that the current is properly recycled from the negative to the positive arms of the charge pumps, some care may be required in the design of the voltage source Vin. Specifically, it may be necessary to design it with a particular resistance and to use a decoupling capacitor on the output. This is a known technique. Also if the load current in the positive arms is less in magnitude than the load current in the negative arms so that current is drawn from the voltage source Vin, it is desirable that Vin should be made as efficient as possible. Circuits for efficiently generating a voltage between the power supply voltages are also well known. For example a capacitive divider circuit can generate $V_{DD}/2$ with an ideal efficiency (assuming ideal switches an infinite capacitors) of 100%.

Figure 2:
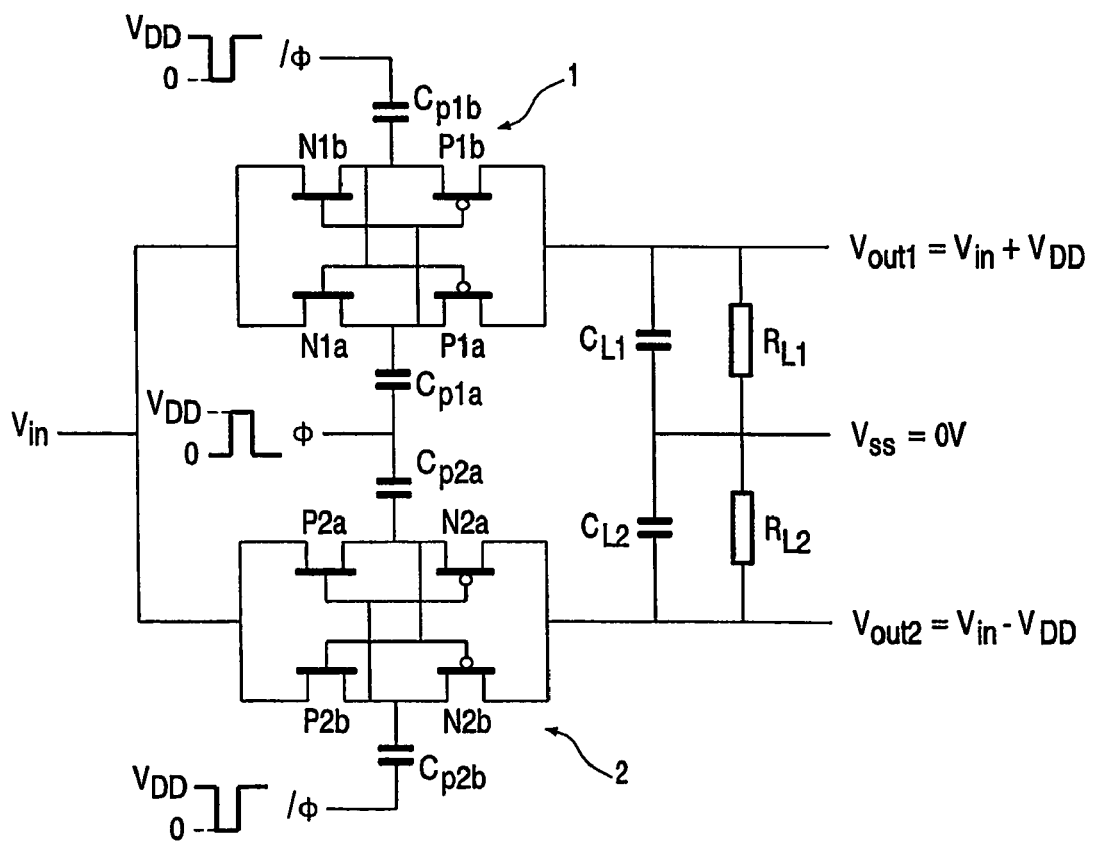
FIG. 2 is a more detailed circuit diagram showing one implementation of the circuit of FIG. 1.

A more detailed example of a circuit implementation is shown in FIG. 2, again each of the charge pumps consists of a single boosting stage, for simplicity. The output loads are represented as resistors $R_{L1}$ and $R_{L2}$ in FIG. 2. In FIG. 2, NMOS transistors are designated as "N" and PMOS transistors are designated as "P".

The voltage increasing stage 1 and the voltage decreasing stage 2 are implemented using poly-silicon TFTs (thin film transistors) and suitable for integration into an active matrix LCD display with input supply voltages of 5V and 0V. From these input voltages, the circuit is used to generate +7.5V and -2.5V, which are required for CMOS switches to ensure they can be properly turned on and off.

Each stage 1, 2 is associated with two charge pump capacitors $C_{p1a}$, $C_{p1b}$ and $C_{p2a}$, $C_{p2b}$. Each capacitor connects to the junction between an input transistor switch $N_{1a}$, $N_{1b}$, $P_{2a}$, $P_{2b}$ and an output transistor switch $P_{1b}$, $P_{1a}$, $N_{2a}$, $N_{2b}$. Thus, each stage effectively comprises two of the charge pump arrangements shown in FIG. 1, arranged in parallel with each other. This arrangement enables charge pumping to be performed during all cycles.

In FIG. 2, the two charge pumps in parallel enable appropriate gate voltages to be generated simply for the input and output switches, which are implemented as transistors. These gate voltages have a transition of equal magnitude to the clock transition, but both levels are shifted up (or down) by an amount equal to Vin.

The switches may instead be implemented as diodes, and no control signal are then required, as the diodes turn on and off as a natural consequence of the way the charge pump circuit functions.

The operation of each stage will be described in detail with reference to FIGS. 3A and 3B.

Figure 3A:
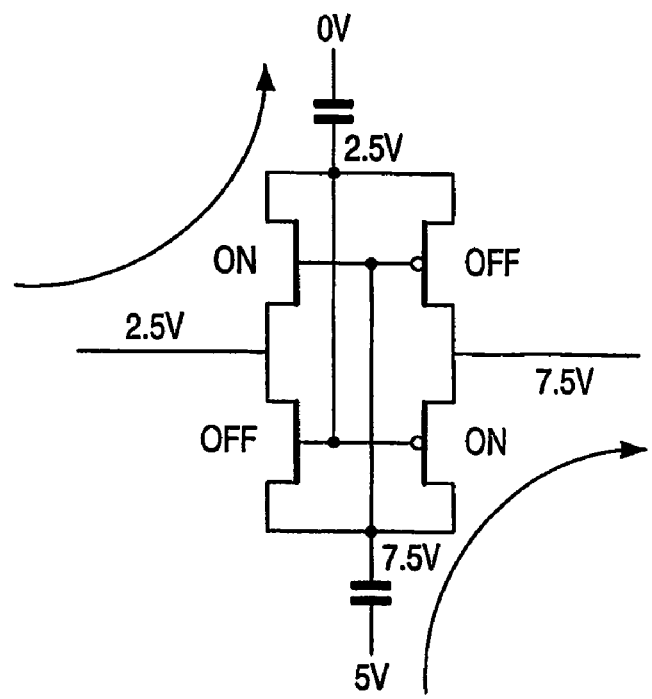
FIGS. 3A and 3B are used to explain in greater detail the operation of the circuit of FIG. 2.

FIG. 3A shows the components of the voltage boosting stage 1. Voltages are indicated in the Figure assuming the low power rail to be 0V and the high power rail to be 5V. FIG. 3A shows the cycle in which the upper control terminal is at the low voltage and the lower control terminal is at the high voltage. The transistors and capacitors have not been given references in FIGS. 3A and 3B, as they correspond to those of FIG. 2. The references of FIG. 2 are thus used to identify the corresponding components in FIG. 3. The arrows in FIGS. 3A and 3B represent the flow of charge.

The input voltage of 2.5V charges the upper capacitor $C_{p1b}$ to 2.5V through transistor $N_{1b}$ which is turned on. The equilibrium at the output is 7.5V, and as shown the lower capacitor $C_{p1a}$ is charged with 2.5V across it and thereby presents 7.5V to the output. Charge is pumped to the output through transistor $P_{1a}$ to maintain the output at this voltage.

Figure 3B:
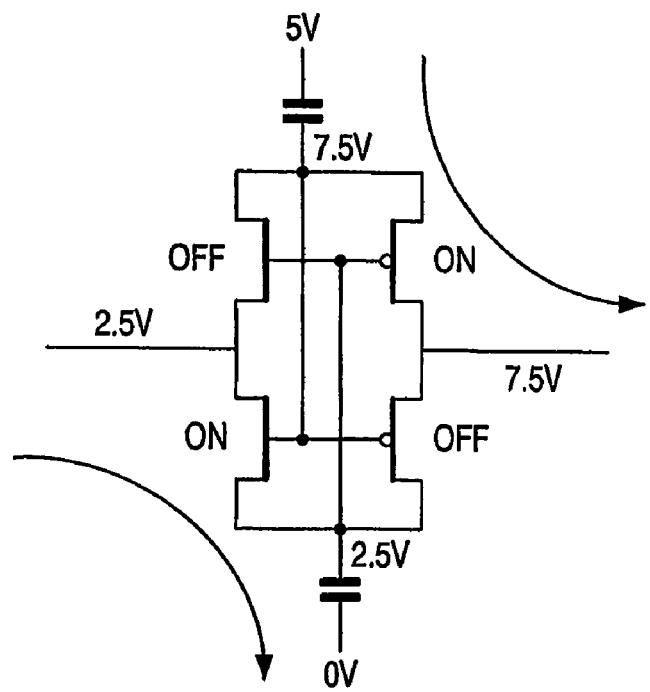

FIG. 3B shows the cycle in which the upper control terminal is at the high voltage and the lower control terminal is at the low voltage.

The input voltage of 2.5V charges the lower capacitor $C_{p1a}$ to 2.5V through transistor $N_{1a}$ which is turned on. The upper capacitor $C_{p1b}$ is charged with 2.5V across it and presents 7.5V to the output. Charge is pumped to the output through transistor $P_{1b}$ to maintain the output at this voltage.

This arrangement thus provides charge pumping during all clock cycles.

The voltage decreasing stage 2 operates in the same way, although with charge flowing in the opposite direction.

As shown in FIG. 2, the charge pump section of the voltage increasing stage 1 the charge pump section of the voltage decreasing stage 2 are connected together by the charge pump capacitors $C_{p1a}$ and $C_{p2a}$ which are connected together in series, with one of the control lines at the junction.

The circuit of FIG. 2 has two charge pump capacitors for each charge pump stage. These capacitors need to be of a certain size to perform the charge pump operation, and this increases the area needed by the circuit.

Figure 4:
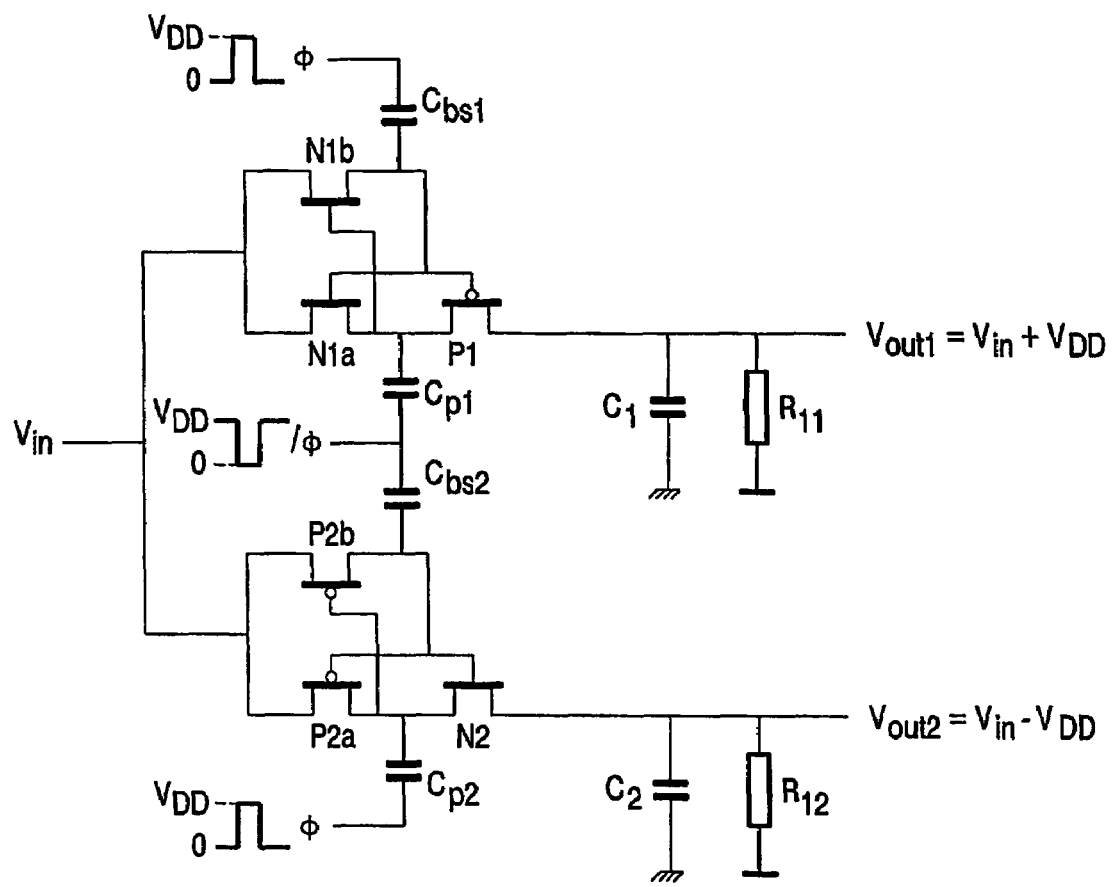
FIG. 4 is a more detailed circuit diagram showing another implementation of the circuit of FIG. 1.

FIG. 4 shows an alternative implementation with just one pump capacitor per charge pump stage, Cp1 and Cp2. Each charge pump stage also has only one output switch P1 and N2. Accordingly, charge pumping is performed by each stage during only one of the two cycles.

In the voltage increasing stage, one input switch N1b and capacitor Cbs1 are only used to generate a level shifted clock to drive the gate signals for the other input switch N1a and the output switch P1. Similarly, in the voltage decreasing stage, the input switch P2b and the capacitor Cbs2 are only used to generate a level shifted clock for the gates of the input switch P2a and the output switch N2.

As capacitors Cbs1 and Cbs2 are not used to pump charge into the circuit, their value can be much smaller than Cp1 and Cp2. This circuit is preferred, particularly if the values of Cp1 and Cp2 are too big to enable them to be integrated onto the glass.

At the outputs $V_{out1}$ and $V_{out2}$, capacitors $C_1$ and $C_2$ are provided and connected to ground. Resistors $R_{11}$ and $R_{12}$ are provided.

Figure 5:
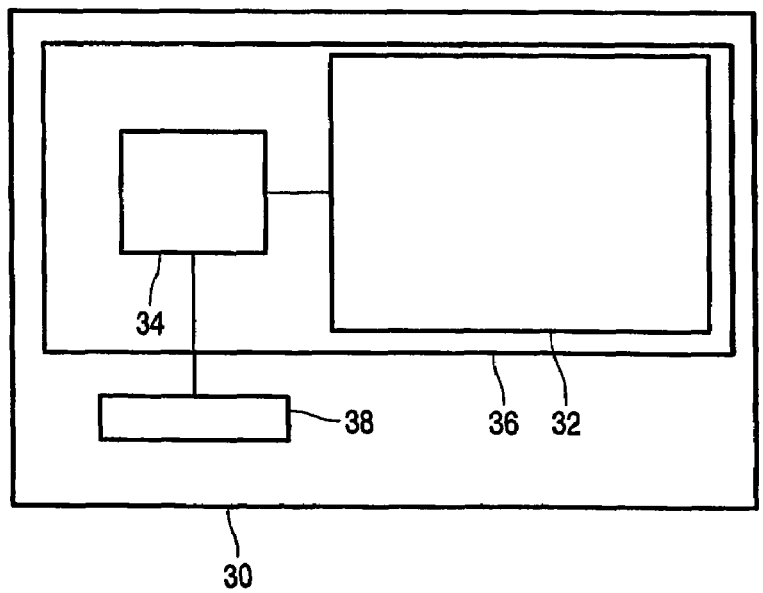
FIG. 5 is a schematic plan view of a LAE device incorporating a display and a charge pump circuit.

FIG. 5 shows an integrated circuit device 30 including an active matrix liquid crystal display device which uses a TFT switching array 32. The switching array and a charge pump circuit 34 are provided on a common substrate 36, and a low voltage power supply 38 (for example a 3V battery) provides power to the integrated circuit 30.

Figure 6:
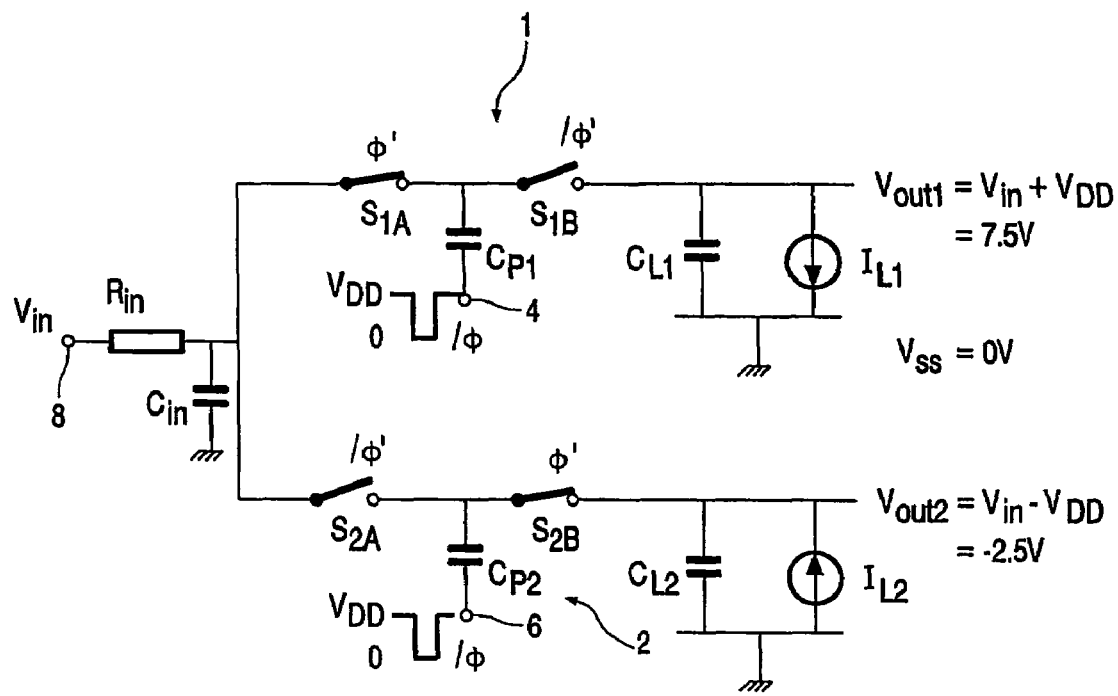
FIGS. 6 to 11 illustrate schematically further, alternative, embodiments of charge pump circuits in accordance with the invention.

FIG. 6 shows the same basic charge pump circuit as in FIG. 1, but with the timing of the control signals applied to switches S1A, S1B, S2A, S2B and control terminals 4 and 6 modified. In this case the timing of the control signals applied to S1B and S2A is the same as the timing of the waveform applied to terminals 4 and 6. This means that when terminals 4 and 6 are connected to the high voltage level VDD, switches S1B and S2A are closed (i.e. low impedance) and switches S1A and S2B are open (i.e. high impedance). Conversely, when terminals 4 and 6 are connected to the low voltage level, 0 Volts in FIG. 6, switches S1B and S2A are open (i.e. high impedance) and switches S1A and S2B are closed (i.e. low impedance). This modification to the timing means there is a delay of half a clock period after charge is injected from the voltage decreasing stage 2 before it is recycled into the voltage increasing stage 1. In order to ensure that charge is properly recycled it is necessary to decouple the voltage source Vin as mentioned earlier, and here this is achieved through a resistor Rin and capacitor Cin. In effect, the capacitor Cin acts as a temporary storage node for charge injected from the voltage decreasing stage 2 before it is recycled into the voltage increasing stage 1.

Figure 7:
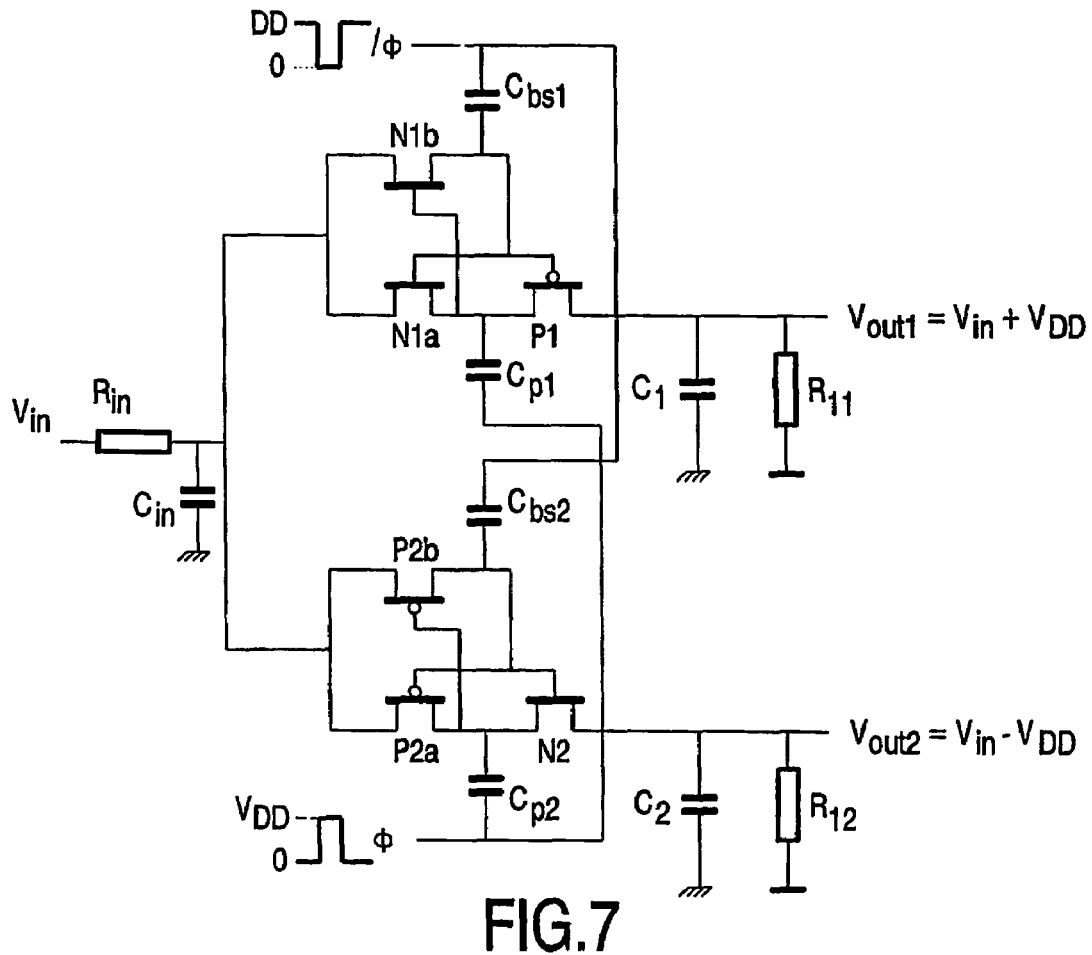

FIG. 7 shows a possible circuit for implementing the schematic configuration shown in FIG. 6. The circuit is the same as in FIG. 4, but the clock signals applied to Cp1, Cp2, Cbs1 and Cbs2 have been modified so that the timing is as shown in FIG. 6. FIG. 7 also shows explicitly the resistor Rin and capacitor Cin used to decouple the voltage source Vin.

At the outputs $V_{out1}$ and $V_{out2}$, capacitors $C_1$ and $C_2$ are provided and connected to ground. Resistors $R_{11}$ and $R_{12}$ are provided.

In the embodiments described so far the control signals applied to the switches in the charge pump and the voltages levels applied to the charge pump capacitors are complementary, which means all transitions take place simultaneously so that when a particular signal switches from low to high, its complement switches from high to low. It is known that the efficiency of charge pumps can be improved in some cases by using control signals that do not switch simultaneously. This will be referred to as the use of non-overlapping control signals. Non-overlapping control signals can be used to ensure that charge does not leak through the charge pump switches in the wrong direction during the finite time that they take to switch. The remaining examples show how non-overlapping control signals can be used in conjunction with this invention.

Figure 8:
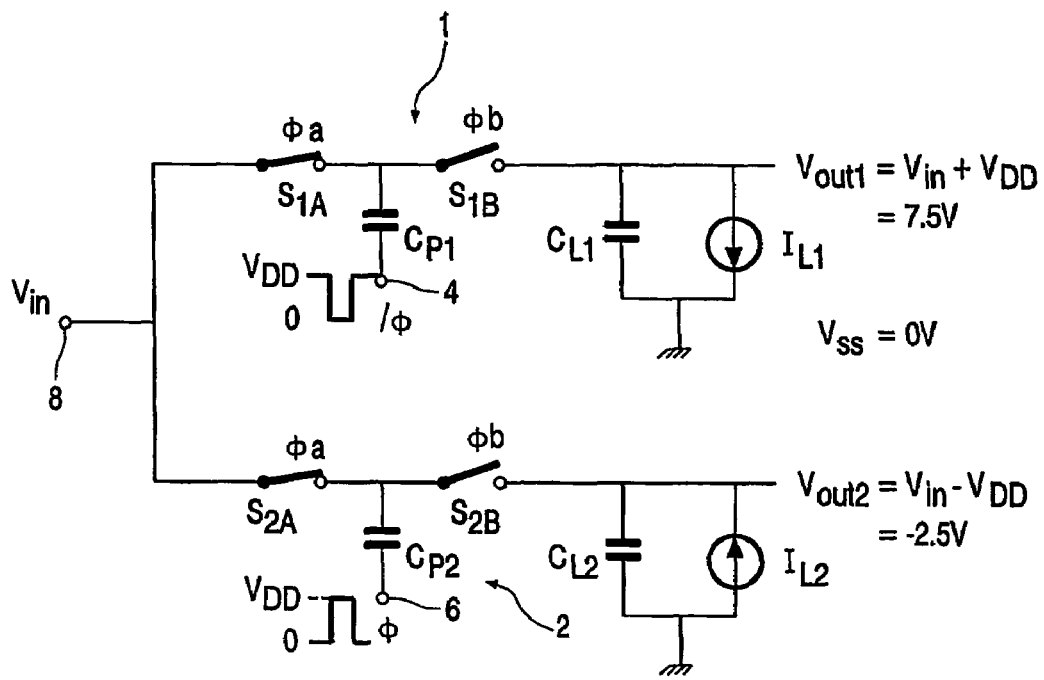

FIG. 8 shows a schematic form of a charge pump with non-overlapping control signals $\phi a$ and $\phi b$ applied the charge pump switches and complementary waveforms $\phi$ and $/\phi$ applied to terminals 6 and 4. When $\phi$ switches to a high level terminal 6 is connected to the high power supply voltage and terminal 4 is connected to the low power supply voltage. During this transition all the switches S1A, S1B, S2A and S2B are open (i.e. high impedance). After a delay period a transition in $\phi a$ causes S1A and S2A to close, which connects capacitors CP1 and CP2 to Vin. After a charging period, a further transition in $\phi a$ causes S1A and S2A to open. After a delay period $\phi$ switches to a low level so terminal 6 is connected to the low voltage supply and terminal 4 is connected to the high voltage supply. Then, after a further delay period a transition on $\phi b$ causes S1B and S2B to close, which connects CP1 to CL1 and CP2 to CL2. Then after a further charging period a transition in $\phi b$ causes S1B and S2B to open. This cycle is repeated continuously so that CL1 and CL2 are pumped to their respective output voltages as indicated in FIG. 8.

Figure 9:
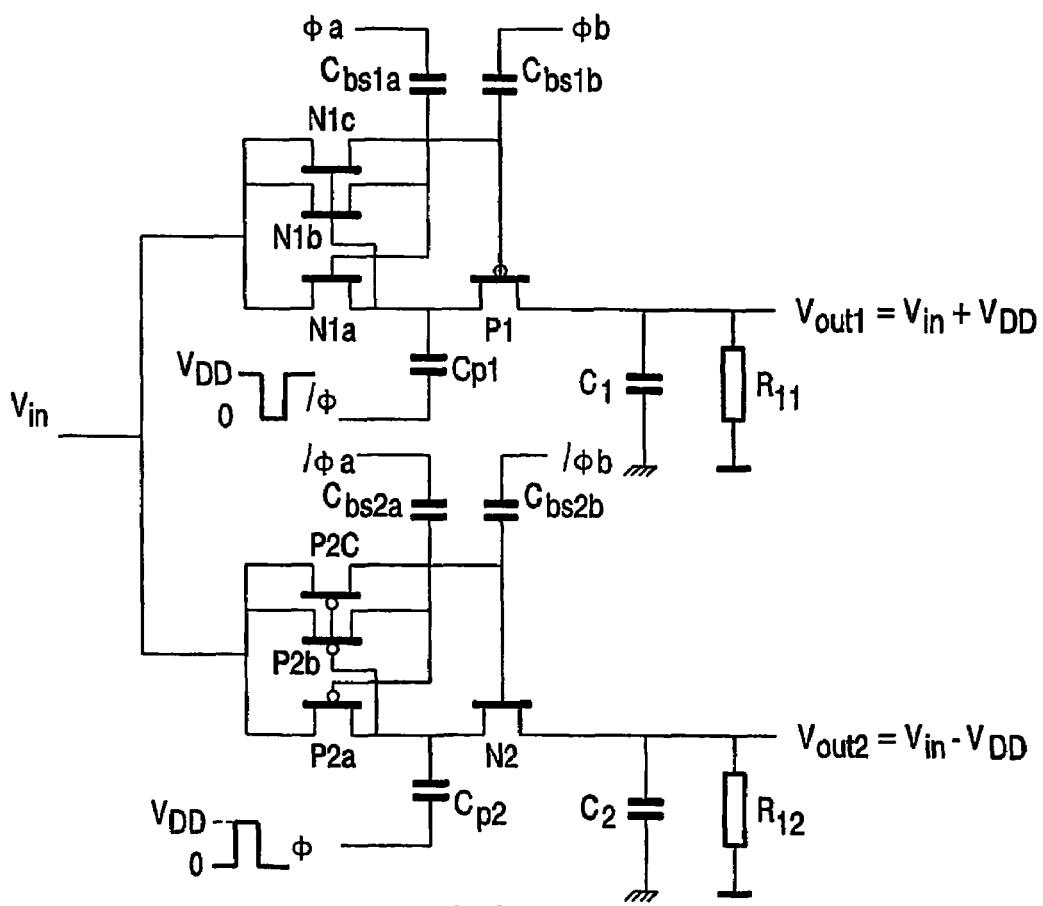

FIG. 9 shows a possible circuit for implementing the schematic configuration shown in FIG. 8. Transistor N1b and capacitor Cbs1a in conjunction with control signal $\phi a$ generate level shifted voltage signals for switching the charge pump transistor N1a. Transistor N1c and capacitor Cbs1b in conjunction with control signal $\phi b$ generate voltage signals for switching the charge pump transistor P1. Transistor P2b and capacitor Cbs2a in conjunction with control signal $/\phi a$ generate voltage signals for switching the charge pump transistor P2a. Transistor P2c and capacitor Cbs2b in conjunction with control signal /φb generate voltage signals for switching the charge pump transistor N2. This circuit requires the generation of 6 control signal φ, φa, φb and their complements.

At the outputs $V_{out1}$ and $V_{out2}$, capacitors $C_1$ and $C_2$ are provided and connected to ground. Resistors $R_{11}$ and $R_{12}$ are provided.

Figure 10:
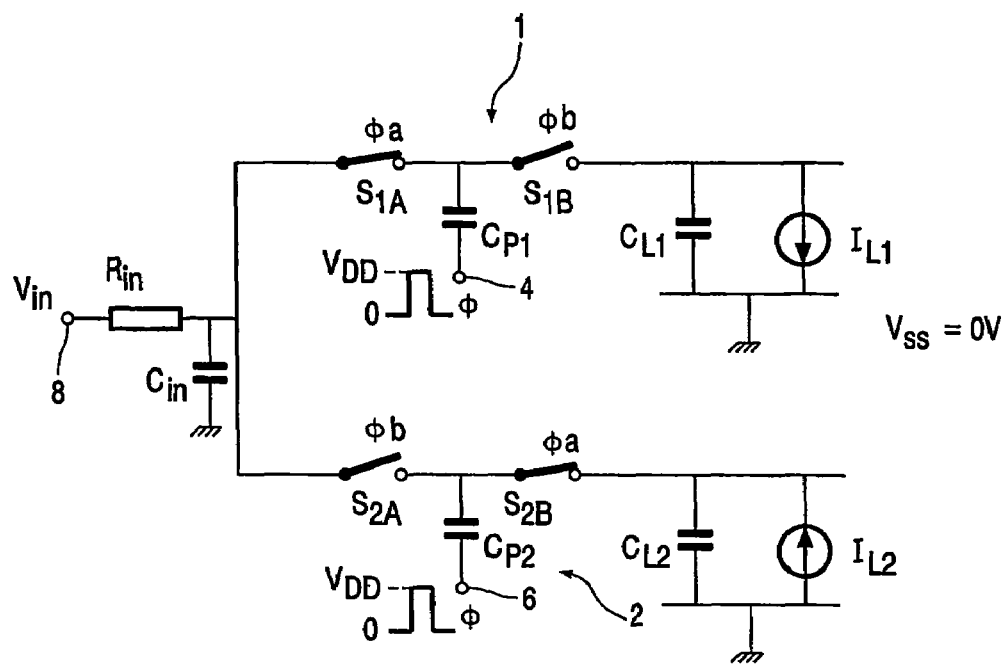

FIG. 10 shows a schematic form of a charge pump with non-overlapping control signals φa and φb applied the charge pump switches and a waveform φ applied to terminals 6 and 4. When φ switches to a low level terminals 4 and 6 are connected to the low power supply voltage. During this transition all the switches S1A, S1B, S2A and S2B are open. After a delay period a transition in φa causes S1A and S2B to close. This connects CP1 to Vin and CP2 to CL2. After a charging period, a further transition in φa causes S1A and S2B to open. After a delay period φ switches to a high level so terminals 4 and 6 are connected to the high voltage supply. Then, after a further delay period a transition on φb causes S1B and S2A to close, which connects CP1 to CL1 and CP2 to Vin. Then after a further charging period a transition in φb causes S1B and S2A to open. This cycle is repeated continuously so that CL1 and CL2 are pumped to their respective output voltages as indicated in FIG. 8.

Figure 11:
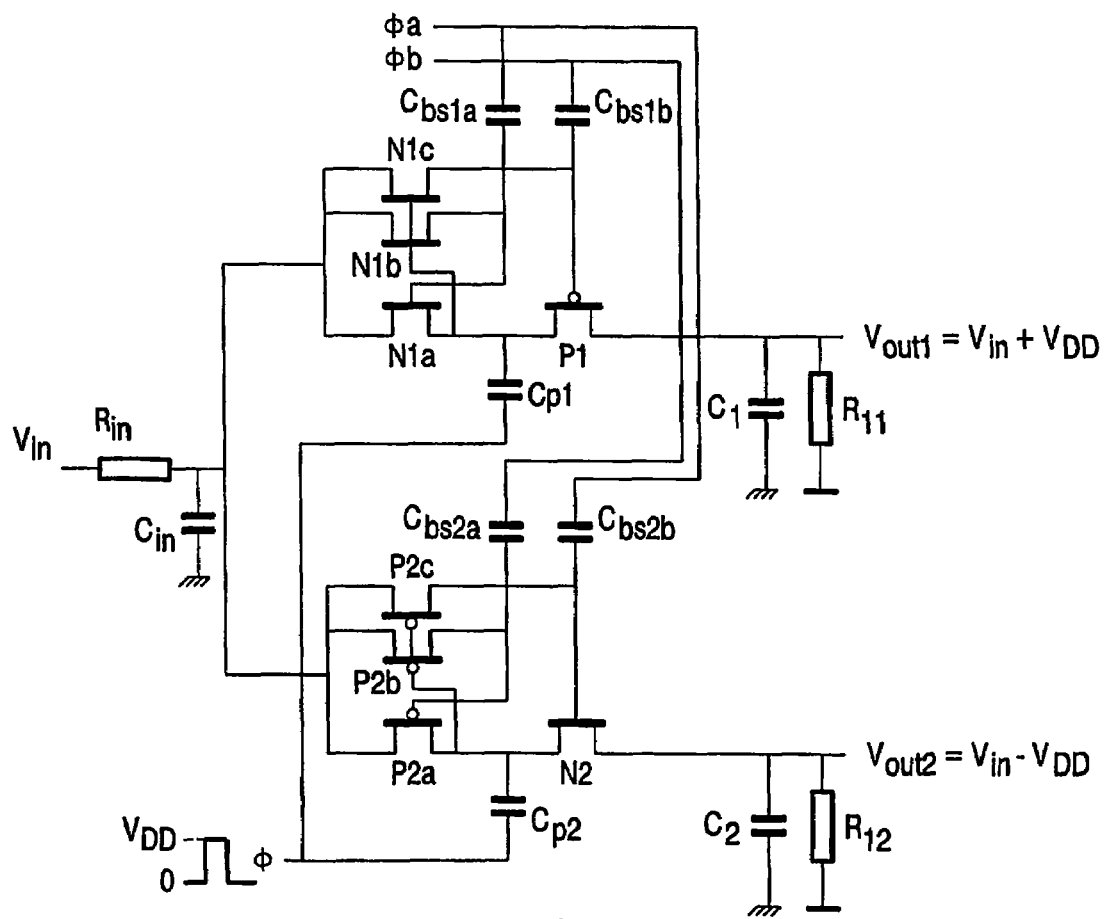

FIG. 11 shows a possible circuit for implementing the schematic configuration shown in FIG. 10. The basic circuit is the same as in FIG. 9, but the control signals have been modified so that the switching sequence of the circuit is as shown in FIG. 10. The advantage of this circuit is that it requires the generation of just three control signals φ, φa and φb compared with six control signals for the circuit in FIG. 9. As described in the description of FIG. 6 the decoupling of Vin, provided by Rin and Cin in FIGS. 10 and 11, is required to ensure charge is properly recycled from the voltage decreasing charge pump to the voltage increasing charge pump.

At the outputs $V_{out1}$ and $V_{out2}$, capacitors $C_1$ and $C_2$ are provided and connected to ground. Resistors $R_{11}$ and $R_{12}$ are provided.

As previously mentioned, the charge pump circuit of the present invention may be used in large area electronic devices such as active matrix display devices and similar.

However, the charge pump circuit may be used with other types of device. Indeed, charge pumps are a very widely used circuit element found in many other applications. Examples include the generation of the programming and erase voltages for flash memories and in low voltage ICs where boosted voltages may be required by the analogue switches. Charge pumps may also be used in integrated control circuitry of a semiconductor power switch. The power switch may be, for example, a MOSFET. There are of course many more applications and various other modifications will be apparent to those skilled in the art.

The invention claimed is:

1. A charge pump circuit comprising:
   a voltage increasing stage, wherein the voltage increasing stage comprises at least one charge pump section;
   a voltage decreasing stage in parallel with the voltage increasing stage, wherein the voltage decreasing stage comprises at least one charge pump section; and
   a shared input to the voltage increasing and voltage decreasing stages,
   wherein the at least one charge pump section of the voltage increasing stage and the at least one charge pump section of the voltage decreasing stage each comprises a first input switch and output switch in series connected together at a first junction node, and a second input switch connected between the input and a second junction node, a first charge pump capacitor connected between the first junction node and a first control line and a second charge pump capacitor connected between the second junction node and a second control line, wherein the second junction node provides control signals for the first input and output switches.

2. A circuit as claimed in claim 1, wherein the voltage increasing stage increases an input voltage by an integer multiple of the difference between a low supply line voltage and a high supply line voltage and the voltage decreasing stage decreases the input voltage by the integer multiple of the difference between the low supply line voltage and the high supply line voltage.

3. A circuit as claimed in claim 1, wherein the at least one charge pump section of the voltage increasing stage comprises a plurality of charge pump sections, each increasing a corresponding input voltage by the difference between a low supply line voltage and a high supply line voltage.

4. A circuit as claimed in claim 3, wherein the at least one charge pump section of the voltage decreasing stage comprises a plurality of charge pump sections, each decreasing a corresponding input voltage by the difference between the low supply line voltage and the high supply line voltage.

5. A circuit as claimed in claim 4, wherein the plurality of charge pump sections of the voltage increasing stage and the plurality of the charge pump sections of the voltage decreasing stage each comprises the first input switch and output switch in series connected together at the first junction node, and the first charge pump capacitor connected between the first junction node and the first control line.

6. A circuit as claimed in claim 1, wherein complementary signals are applied to the first and second control lines.

7. A circuit as claimed in claim 1, wherein non-overlapping signals are applied to the first and second control lines.

8. A circuit as claimed in claim 5, wherein complementary signals are applied to the first and second control lines.

9. A circuit as claimed in claim 5, wherein non-overlapping signals are applied to the first and second control lines.

10. A circuit as claimed in claim 1, wherein the first input switch and output switch of the at least one charge pump section of the voltage increasing stage and the second input switch of the at least one charge pump section of the voltage decreasing stage are operated in complementary manner.

11. A circuit as claimed in claim 1, wherein one of the first and second charge pump capacitors of the at least one charge pump section of the voltage increasing stage and one of the first and second charge pump capacitors of the at least one charge pump section of the voltage decreasing stage are connected together.

12. A circuit as claimed in claim 1, wherein the voltage increasing stage increases an input voltage by an integer multiple of the difference between a low supply line voltage and a high supply line voltage, and the voltage decreasing stage decreases the input voltage by the integer multiple of the difference between the low supply line voltage and the high supply line voltage, and wherein a voltage is applied to the shared input between the low supply line voltage and the high supply line voltage.

13. An electronic device including a circuit as claimed in claim 1.

14. A device as claimed in claim 13, wherein the device comprises a liquid crystal display.

15. A device as claimed in claim 14, wherein the circuit and a TFT switching array for the display are provided on a common substrate.

16. A charge pump circuit, comprising:
a voltage increasing stage, wherein the voltage increasing stage comprises at least one charge pump section;
a voltage decreasing stage in parallel with the voltage increasing stage, wherein the voltage decreasing stage comprises at least one charge pump section; and
a shared input to the voltage increasing and voltage decreasing stages,
wherein the at least one charge pump section of the voltage increasing stage and the at least one charge pump section of the voltage decreasing stage each comprises an input switch and an output switch in series connected together at a junction node, and a charge pump capacitor connected between the junction node and a control line, wherein the shared input is connected to at least one input switch of the at least one charge pump section of each of the voltage increasing stage and the voltage decreasing stage and wherein the at least one charge pump section of the voltage increasing stage increases an input voltage by an integer multiple of the difference between a low supply line voltage and a high supply line voltage and the voltage decreasing stage decreases the input voltage by the integer multiple of the difference between the low supply line voltage and the high supply line voltage.

17. A charge pump circuit, comprising:
a voltage increasing stage, wherein the voltage increasing stage comprises at least one charge pump section;
a voltage decreasing stage in parallel with the voltage increasing stage, wherein the voltage decreasing stage comprises at least one charge pump section; and
a shared input to the voltage increasing and voltage decreasing stages,
wherein the at least one charge pump section of the voltage increasing stage and the at least one charge pump section of the voltage decreasing stage each comprises an input switch and output switch in series connected together at a junction node, and a charge pump capacitor connected between the junction node and a control line, wherein the shared input is connected to at least one input switch of the at least one charge pump section of each of the voltage increasing stage and the voltage decreasing stage and wherein the at least one charge pump section of the voltage increasing stage comprises a plurality of charge pump sections, each increasing a corresponding input voltage by the difference between a low supply line voltage and a high supply line voltage.

18. A charge pump circuit, comprising:
a voltage increasing stage, wherein the voltage increasing stage comprises at least one charge pump section;
a voltage decreasing state in parallel with the voltage increasing state, wherein the voltage decreasing stage comprises at least one charge pump section; and
a shared input to the voltage increasing and voltage decreasing stages,
wherein the at least one charge pump section of the voltage increasing stage and the at least one charge pump section of the voltage decreasing stage each comprises an input switch and an output switch in series connected together at a junction node, and a charge pump capacitor connected between the junction node and a control line, wherein the shared input is connected to at least one input switch of the at least one charge pump section of each of the voltage increasing and voltage decreasing stages and wherein the voltage decreasing stage comprises a plurality of charge pump sections, each decreasing a corresponding input voltage by the difference between a low supply line voltage and a high supply line voltage.

19. A charge pump circuit comprising:
a voltage increasing stage, wherein the voltage increasing stage comprises at least one charge pump section;
a voltage decreasing stage in parallel with the voltage increasing stage, wherein the voltage decreasing stage comprises at least one charge pump section; and
a shared input to the voltage increasing and voltage decreasing stages,
wherein the at least one charge pump section of the voltage increasing stage and the at least one charge pump section of the voltage decreasing stage each comprises a first input switch and output switch in series connected together at a first junction node, and a second input switch connected between the input and a second junction node, a first charge pump capacitor connected between the first junction node and a first control line and a second charge pump capacitor connected between the second junction node and a second control line, and
wherein a one of the first and second charge pump capacitors of the at least one charge pump section of the voltage increasing stage and one of the first and second charge pump capacitor of the at least one charge pump section of the voltage decreasing stage are connected together.

* * * * *